United States Patent
Vergin

(10) Patent No.: US 9,610,956 B2
(45) Date of Patent: Apr. 4, 2017

(54) REAR ZONE MODULE AND REAR ZONE CONTROLLER

(71) Applicant: Flextronics AP, LLC, Broomfield, CO (US)

(72) Inventor: William E. Vergin, Sterling Heights, MI (US)

(73) Assignee: FLEXTRONICS AP, LLC., Broomfield, CO (US)

( * ) Notice: Subject to any disclaimer, the term of this patent is extended or adjusted under 35 U.S.C. 154(b) by 194 days.

(21) Appl. No.: 13/837,157

(22) Filed: Mar. 15, 2013

(65) Prior Publication Data

US 2013/0245885 A1 Sep. 19, 2013

Related U.S. Application Data

(60) Provisional application No. 61/612,033, filed on Mar. 16, 2012.

(51) Int. Cl.
*B60W 50/00* (2006.01)
*B60R 16/03* (2006.01)
*B60S 1/58* (2006.01)

(52) U.S. Cl.
CPC ......... *B60W 50/0098* (2013.01); *B60R 16/03* (2013.01); *B60S 1/583* (2013.01)

(58) Field of Classification Search
CPC ............................ B60W 50/0098; B60R 16/03
USPC .......................................................... 701/36
See application file for complete search history.

(56) References Cited

U.S. PATENT DOCUMENTS

| 4,942,571 | A | | 7/1990 | Moller et al. |
| 5,222,775 | A | * | 6/1993 | Kato ............................. 292/201 |
| 5,764,010 | A | * | 6/1998 | Maue et al. .................. 318/443 |
| 5,811,891 | A | * | 9/1998 | Yanase .......................... 307/112 |
| 5,916,327 | A | * | 6/1999 | Maue et al. ................. 74/471 R |
| 6,111,378 | A | * | 8/2000 | LeMay et al. ................ 318/443 |
| 6,449,798 | B1 | | 9/2002 | Rivin |
| 6,700,795 | B1 | * | 3/2004 | Jones et al. .................... 361/784 |
| 6,900,555 | B2 | * | 5/2005 | Sakamoto ................. H02J 1/06 307/10.1 |
| 7,042,363 | B2 | * | 5/2006 | Katrak et al. ................. 340/644 |
| 7,446,425 | B2 | * | 11/2008 | Sato ................................. 290/7 |
| 2001/0005084 | A1 | | 6/2001 | Ponziani |

(Continued)

FOREIGN PATENT DOCUMENTS

EP 0 307 344 3/1989

*Primary Examiner* — Basil T Jos
(74) *Attorney, Agent, or Firm* — Volpe and Koenig, P.C.

(57) ABSTRACT

Described herein is a rear zone module and rear zone controller that minimizes wire gauge and current draw. The rear zone module shares outputs amongst several functions including rear windshield wiper, heated back window, power liftgate controller and the like. These outputs can be shared because not all functions are required to be active at the same time. For example, a vehicle includes a rear zone module (RZM) that includes at least a power liftgate (PLG) module, heated back window module, and a rear window wiper module. The vehicle also includes a controller configured to selectively control current with respect to at least the PLG module, heated back window module, and a rear window wiper module. The interconnections between the RZM and controller are minimized by sharing the interconnections as the PLG module operates mutually exclusively from the heated back window and rear window wiper module.

16 Claims, 15 Drawing Sheets

(56) References Cited

U.S. PATENT DOCUMENTS

| | | | |
|---|---|---|---|
| 2007/0146973 A1* | 6/2007 | Leiber | 361/641 |
| 2007/0274695 A1* | 11/2007 | Chevalier | 388/907.2 |
| 2008/0100247 A1* | 5/2008 | Averitt | G05B 19/0428 318/466 |
| 2011/0225889 A1* | 9/2011 | Sohn et al. | 49/358 |
| 2012/0326464 A1 | 12/2012 | Kileen | |

* cited by examiner

Mass Analysis

| Description | Gauge | Length(m) | Wt g/m | Wt grams | w-PLG Rt Mini-Van Weight (kg) | w/o PLG | Comments |
|---|---|---|---|---|---|---|---|
| Htd Back Window | 12 | 6 | 32.3 | 193.8000 | 0.1938 | 0.1938 | |
| Rear Wiper Mtr | 16 | 6 | 13.5 | 81.0000 | 0.0810 | 0.0810 | |
| Rear Wiper Sense | 22 | 6 | 5 | 30.0000 | 0.0300 | 0.0300 | |
| Rear Vent Switch | | | | | | | |
| Open | 16 | 6 | 13.5 | 81.0000 | 0.0810 | 0.0810 | |
| Close | 16 | 6 | 13.5 | 81.0000 | 0.0810 | 0.0810 | |
| Sw Asm | | | | | | 0.0500 | Savings due to integration in DDS |
| Rear Lock | | | | | | | |
| Lock | 18 | 6 | 9.7 | 58.2000 | 0.0582 | 0.0582 | |
| Unlock | 18 | 6 | 9.7 | 58.2000 | 0.0582 | 0.0582 | |
| PLG Vehicles | | | | | | | |
| RZM | | | | | 0.0500 | | Savings due to I/O sharing |
| PZM Pwr Delta | 12 | 6 | 11.2 | 67.2000 | (0.0672) | | 14 Ga to 12 Ga |
| RZM Ground Delta | 12 | 6 | 11.2 | 67.2000 | (0.0672) | | 14 Ga to 12 Ga |
| non-PLG | | | | | | | |
| RZM | | | | | | (0.0480) | Incremental excluding relays and associated |
| PZM Pwr (non-PLG) | 12 | 6 | 32.3 | 193.8000 | | (0.1938) | Add 12 Ga |
| RZM Ground(non PLG) | 12 | 6 | 32.3 | 193.8000 | | (0.1938) | Add 12 Ga |
| | | | | Total Wiring Weight Savings (kg) | 0.5488 | 0.1956 | |
| | | | | Savings to Fuses, Connectors, Clips, Conduits, etc not included | | | |

Figure 7

High Level Savings Analysis

| Component/Feature | | Current Architecture | Proposed Architecture | Comments |
|---|---|---|---|---|
| Rear Defog | Rear Defog Relay | = | = | Relay moves to RZM |
| | Rear Defog Fuse | | - | Fuse Eliminated |
| | Rear Defog Ground Lug Nut | | - | Ground Lug Eliminated |
| | Rear Defog Ground Terminal | = | = | Replace Ring Terminal with Blade Te |
| Rear Wiper | Rear Wiper Relay | = | = | Relay moves to RZM |
| | Rear Wiper Fuse | | - | Fuse Eliminated |
| | Rear Wiper Ground Lug Nut | | - | Ground Lug Eliminated |
| | Rear Wiper Ground Terminal | = | = | Replace Ring Terminal with Blade Te |
| Rear Vent | Rear Vent Switch | | - | Simplify RZ Switch-Low Current integrated into Driv Dr Sw |
| | Rear Vent Splices (2) | | - | Two Splices Eliminated |

Figure 8

REAR ZONE MODULE AND REAR ZONE CONTROLLER

CROSS REFERENCE TO RELATED APPLICATION

This application claims the benefit of U.S. provisional application No. 61/612,033, filed Mar. 16, 2012, the contents of which are hereby incorporated by reference herein.

FIELD OF INVENTION

This application is related to vehicle electronics.

BACKGROUND

Power distribution throughout the body of a vehicle is implemented using wires. The gauge and mass of the wires varies depending on the number of items requiring power and where the items are located in the vehicle. In some vehicles, a central body controller in a vehicle may be used to control many of the functions in the interior of the passenger compartment. This includes functions located in the rear of the vehicle such as the rear windshield wiper, heated back window, power liftgate controller and the like. In some cases, the automaker partitions the vehicle architecture and includes a rear zone module to control those functions located in the rear. In the event these functions reside in the liftgate, hatch, hatchback, liftback, or any other closure mechanism at the rear of a vehicle (collectively the "liftgate"), it has added issues in that the wire has to be flexible as it needs to pass through a hinged section of the liftgate or the wire harness has to be minimal.

SUMMARY

Described herein is a rear zone module and rear zone controller that minimizes wire gauge and current draw. The rear zone module shares outputs amongst several functions including rear windshield wiper, heated back window, power liftgate controller and the like. These outputs can be shared because not all functions are required to be active at the same time. For example, a vehicle includes a rear zone module (RZM) that includes at least a power liftgate (PLG) module, heated back window module, and a rear window wiper module. The vehicle also includes a controller configured to selectively control current with respect to at least the PLG module, heated back window module, and a rear window wiper module. The interconnections between the RZM and controller are minimized by sharing the interconnections as the PLG module operates mutually exclusively from the heated back window and rear window wiper module.

BRIEF DESCRIPTION OF THE DRAWINGS

FIG. 7 is an example mass analysis;

FIG. 8 is an example high level savings analysis;

FIG. 12 is an example circuit for operation moding wherein rear wiper motor is off, latch motor is off, heated back window is off, and PLG motor is on;

FIG. 13 is an example circuit for operation moding where rear wiper motor is off, latch motor is off, heated back window is off, and PLG motor is on;

DETAILED DESCRIPTION

Figure 1:
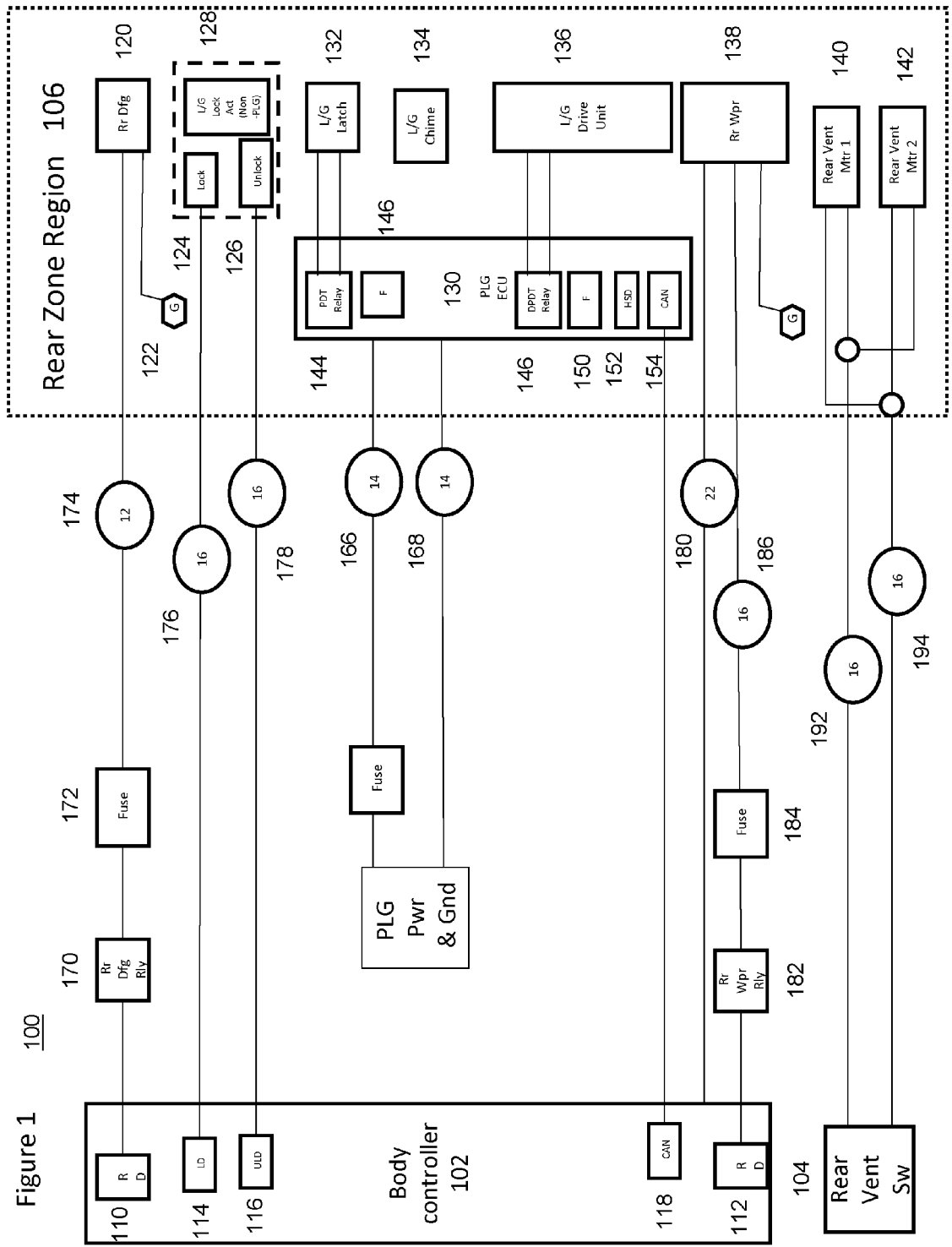
FIG. 1 is a rear zone architecture.

It is to be understood that the figures and descriptions of embodiments of the rear zone module and rear zone controller have been simplified to illustrate elements that are relevant for a clear understanding, while eliminating, for the purpose of clarity, many other elements found in typical electronics packaging. Those of ordinary skill in the art may recognize that other elements and/or steps are desirable and/or required in implementing the rear zone module and rear zone controller. However, because such elements and steps are well known in the art, and because they do not facilitate a better understanding of the rear zone module and rear zone controller, a discussion of such elements and steps is not provided herein.

The non-limiting embodiments described herein are with respect to the rear zone module and rear zone controller. The embodiments and variations described herein, and/or shown in the drawings, are presented by way of example only and are not limiting as to the scope and spirit. The rear zone module and rear zone controller may be used in a number of applications including automobile applications.

FIG. 1 shows a rear zone architecture 100 without the features described herein. A rear zone architecture 100 includes a body controller 102, (this may also be referred to as a smart junction box or a body computer box), a rear vent switch 104, and a rear zone region 106. The body controller 102 may be located in the front of the vehicle. The rear zone region 106 may be associated and/or located in the rear of the vehicle such as in for example, the liftgate. The body controller 102 includes relay drives (RD) 110 and 112, a lock door relay (LD) 114, an unlock door relay (ULD) 116, and a controller area network (CAN) 118. The rear zone region 106 includes a rear defogger (Rr Dfg) 120 tied to ground 122, an activator with lock 124 and unlock 126 functions, an unlock module 126, a liftgate (L/G) lock activation for non-power liftgate 128, a power liftgate (PLG) electronic control unit (ECU) 130, a L/G latch 132, a L/G chime 134, a L/G drive unit 136, a rear wiper 138 tied to ground 139, a rear vent motor 1 140 and rear vent motor 2 142, (e.g., left hand vent and right hand vent). The PLG ECU 130 includes double pole double through (DPDT) relays 144 and 146, metal-oxide-semiconductor field-effect transistor (mosfets) (F) 148 and 150, a high side driver (HSD) 152 and a CAN 154, which in connected to the CAN 118 in body controller 102. A PLG 160 is connected to the rear zone region 106 through a fuse 162 and power and ground 164 is provided to the rear zone region 106 through 16 gauge wires 166 and 168, respectively.

The body controller 102 and rear zone region 106 are connected using relays, fuses and certain gauge wires as further described herein. In particular, the RD 110 is connected to the Rr Dfg 120 through a rear defogger relay (Rr DFG Rly) 170, a fuse 172 and using 12 gauge wires 174. The LD 114 and ULD 116 are connected to the Lock 124 and Unlock 126 using 16 gauge wires 176 and 178, respectively. The Rr Wpr 138 is connected to the body controller using 22 gauge wires 180 and to the RD 112 through rear wiper relay (Rr Wpr Rly) 182, a fuse 184 and using 16 gauge wires 186. The rear vent switch 104 is connected to the rear vent motor 1 140 and rear vent motor 2 142 through ports 188 and 190 using 16 gauge wires 192 and 194, respectively.

Described herein is a rear zone module (RZM) that provides optimization of other electronic control modules (ECMs) in the vehicle, reduces mass, and provides system cost savings. Described also is an innovative use of input/output (I/O) sharing and power moding, energy savings, wiring simplification and cost savings. The RZM is one of many ECMs in a vehicle.

Figure 2:
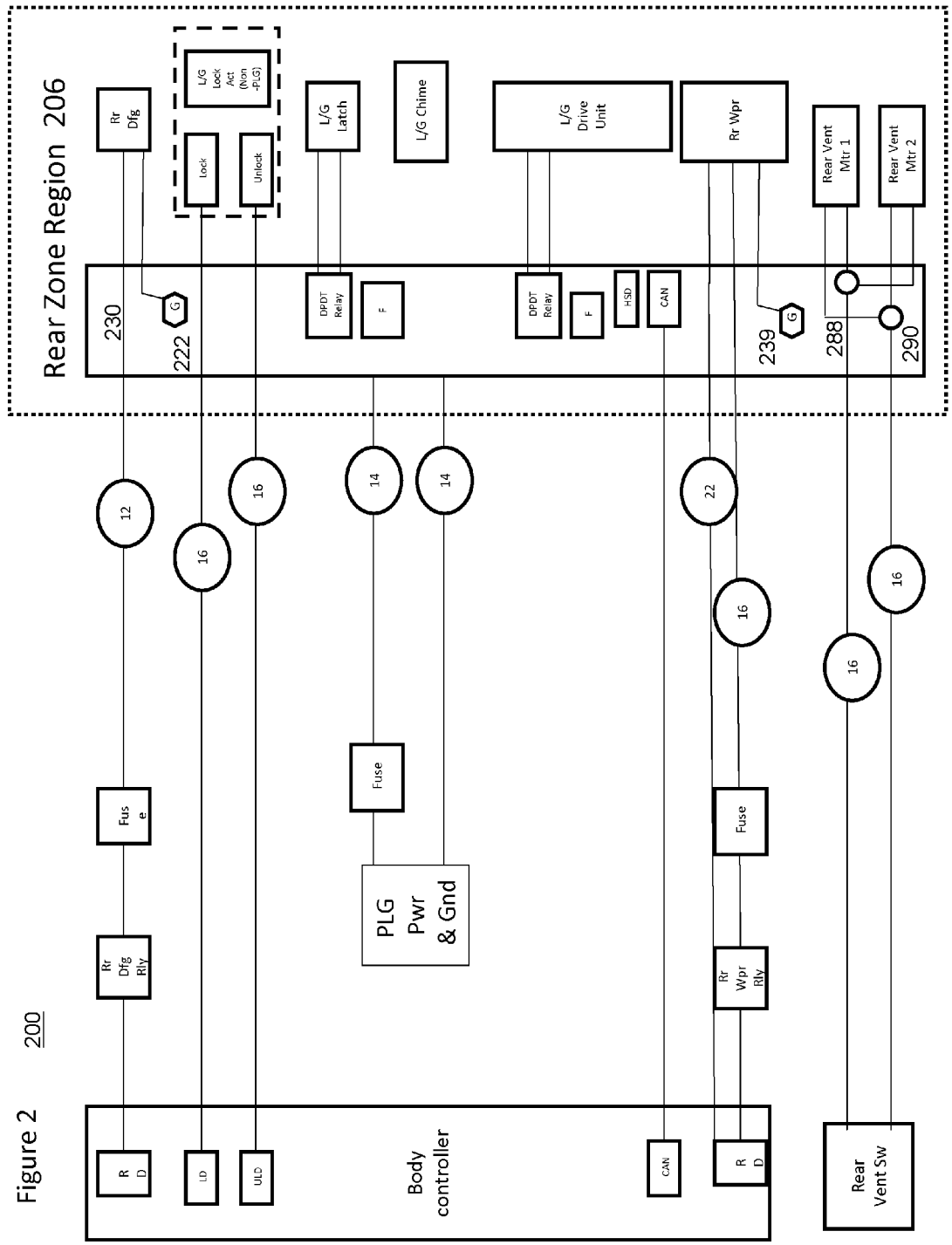
FIG. 2 is a first phase of an example rear zone architecture.

FIG. 2 shows a first phase rear zone architecture 200 where a PLG ECU 230 now encompasses certain aspects of the rear zone region 206 and now becomes a rear zone ECU or rear zone module 230. In particular, rear zone ECU 230 now includes ground 222, ground 239, and ports 288 and 290. The remainder of the first phase rear zone architecture 200 is the same as rear zone architecture 100.

Figure 3:
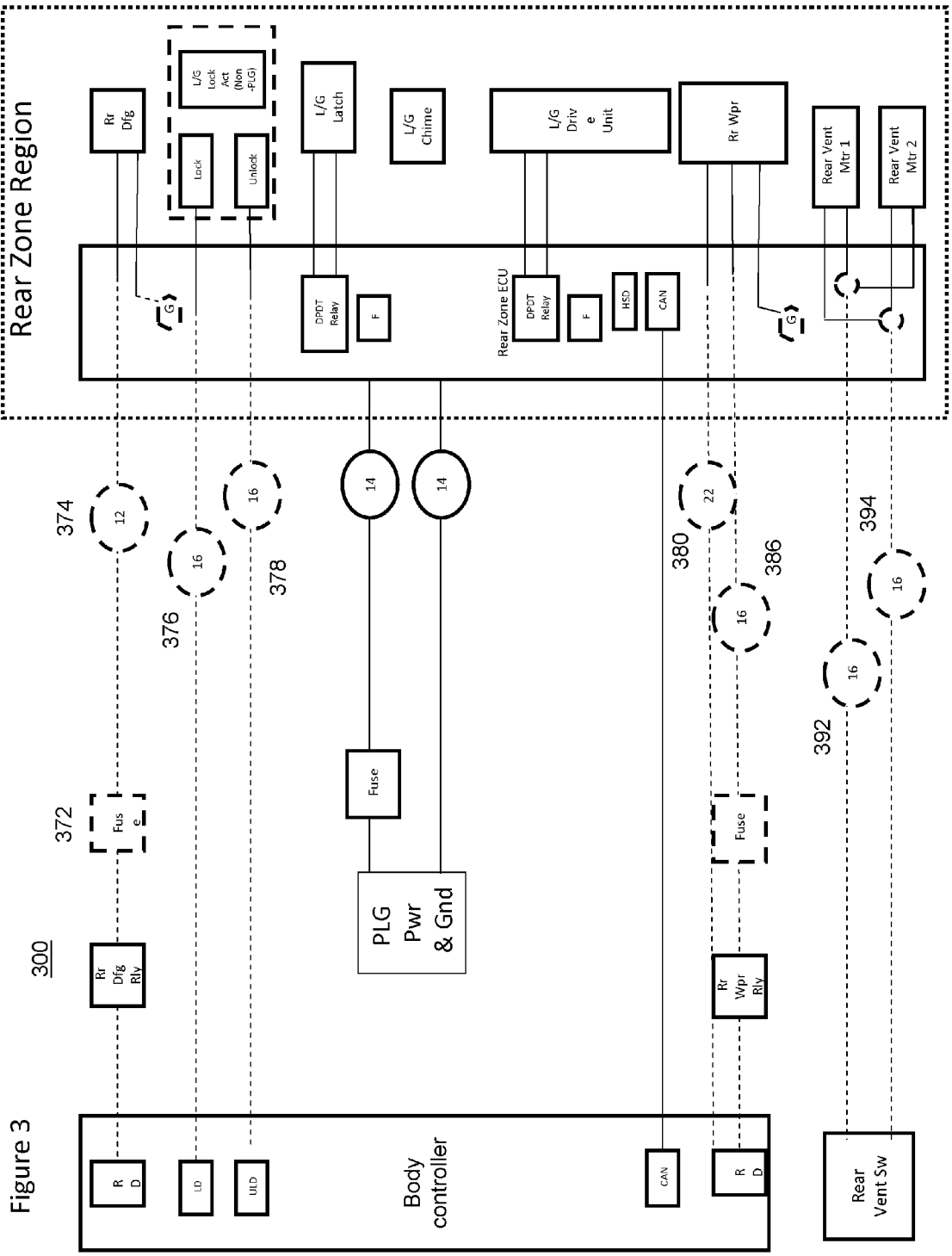
FIG. 3 is a second phase of an example rear zone architecture.
Figure 4:
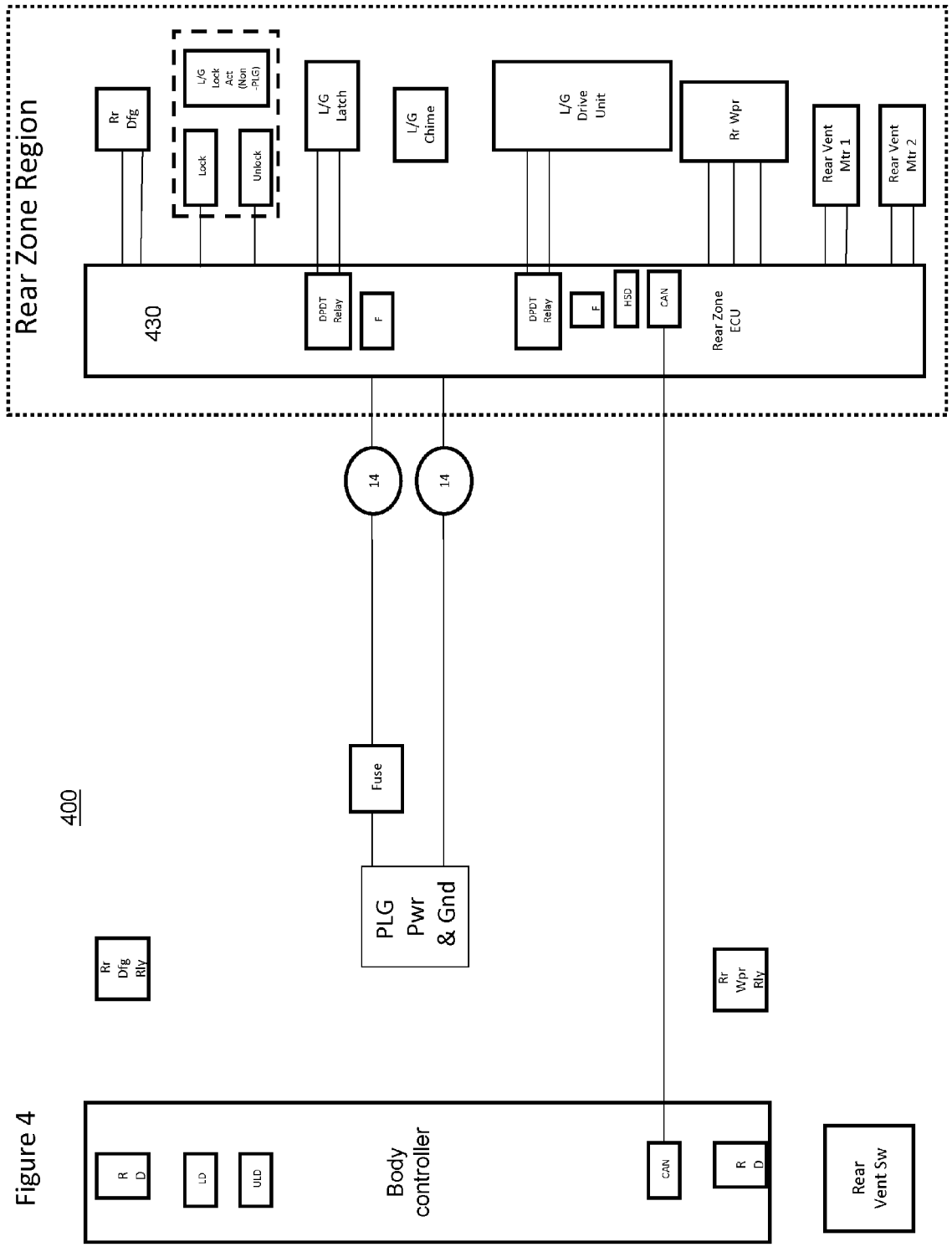
FIG. 4 is a third phase of an example rear zone architecture.

FIG. 3 shows a second phase rear zone architecture 300 where certain aspects of the relays, fuses and wire gauges are to be eliminated as shown by the dashed lines. In particular, fuse 372, fuse 384, 12 gauge wires 374, 16 gauge wires 376, 378, 386, 392 and 394 and 22 gauge wires 380. FIG. 4 shows a third phase rear zone architecture 400 where the items identified in FIG. 3 are eliminated. In addition, the ground 222, ground 239, and ports 288 and 290 of FIG. 2 are now incorporated into the rear zone ECU 430.

Figure 5:
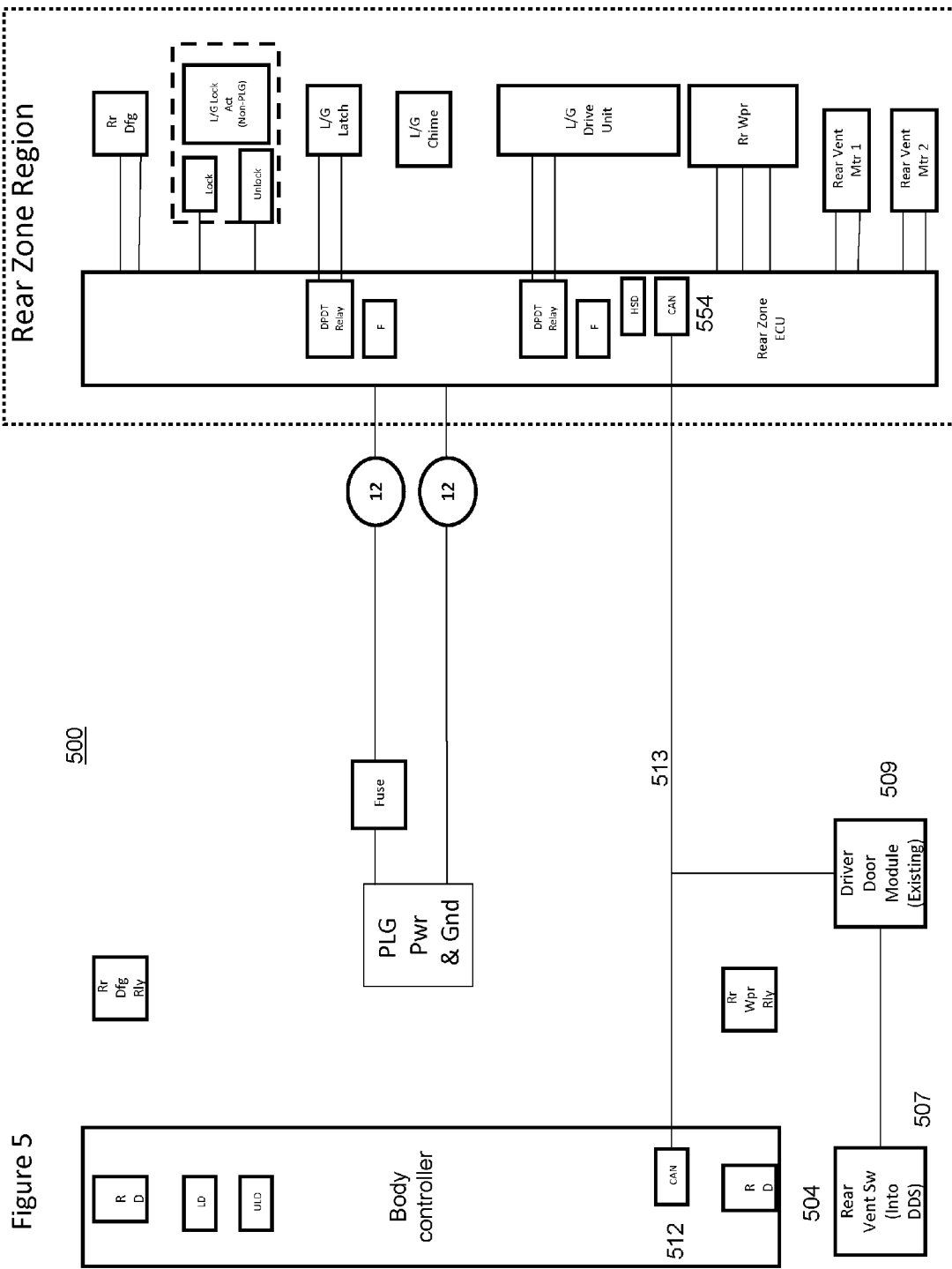
FIG. 5 is a fourth phase of an example rear zone architecture.

FIG. 5 shows a fourth phase rear zone architecture 500 where a rear vent switch 504 is now incorporated into a drivers door switch (DDS) 507 and connected to a rear zone ECU 530 via a driver door module 509. In particular, the driver door module 509 is tied to a wire 513 connecting CAN 512 to CAN 554.

Figure 6:
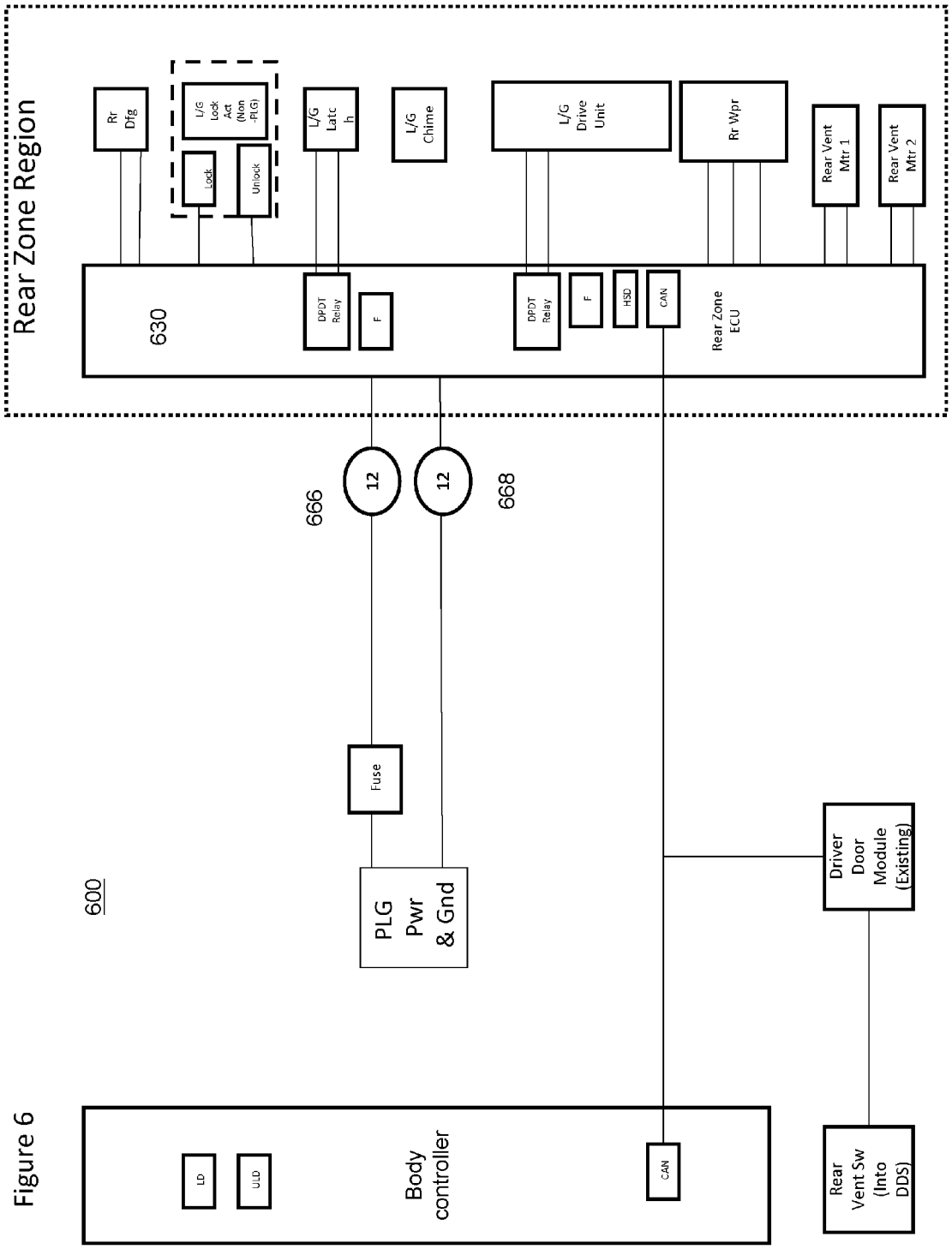
FIG. 6 is a fifth phase of an example rear zone architecture.

FIG. 6 shows a fifth phase rear zone architecture 600 where the rear delays 110 and 112, rear defogger relay 120, and rear wiper relay 282 are now in a rear zone ECU 630 and a gauge of wires 666 and 668 are increased from 14 gauge to 12 gauge to handle the new current load.

As shown in FIG. 1, there are many wires running from the front of the vehicle to the back. This wiring adds to the overall mass of the vehicle. For example, in determining a wiring mass analysis: 1) it is estimated that there is 6 meters of wiring from the body controller 102 in the front of the vehicle to the "D" pillar area, (where the "D" pillar is a sheet metal structural section located in the rear of the vehicle that runs between the roof and the sides of the vehicle); 2) exclude the "D" pillar to actual load; 3) include incremental mass for RZM for Non-PLG modules; and 4) include incremental mass for 14 gauge wire to 12 gauge wire for RZM power and ground. The overall savings that is achieved for a PLG is over 0.5 Kg and for a non-PLG it is approximately 0.2 kg. FIG. 7 shows an example mass analysis and FIG. 8 shows a high level savings analysis.

Input/Output (I/O) optimization/operation moding is described herein. Three high current systems exist in the rear zone: power liftgate, heated back window, and rear window wiper. Properly managing the operation of the high current systems allows for optimization. For example, in one method, the heated back window and rear wiper operation is disabled during PLG operation, (which may last for approximately 5-7 seconds). That is, the PLG operation and heated back window and rear wiper operations are mutually exclusive. Although this has no impact on the customer, it allows the gauge of the wires to be optimized.

Figure 9:
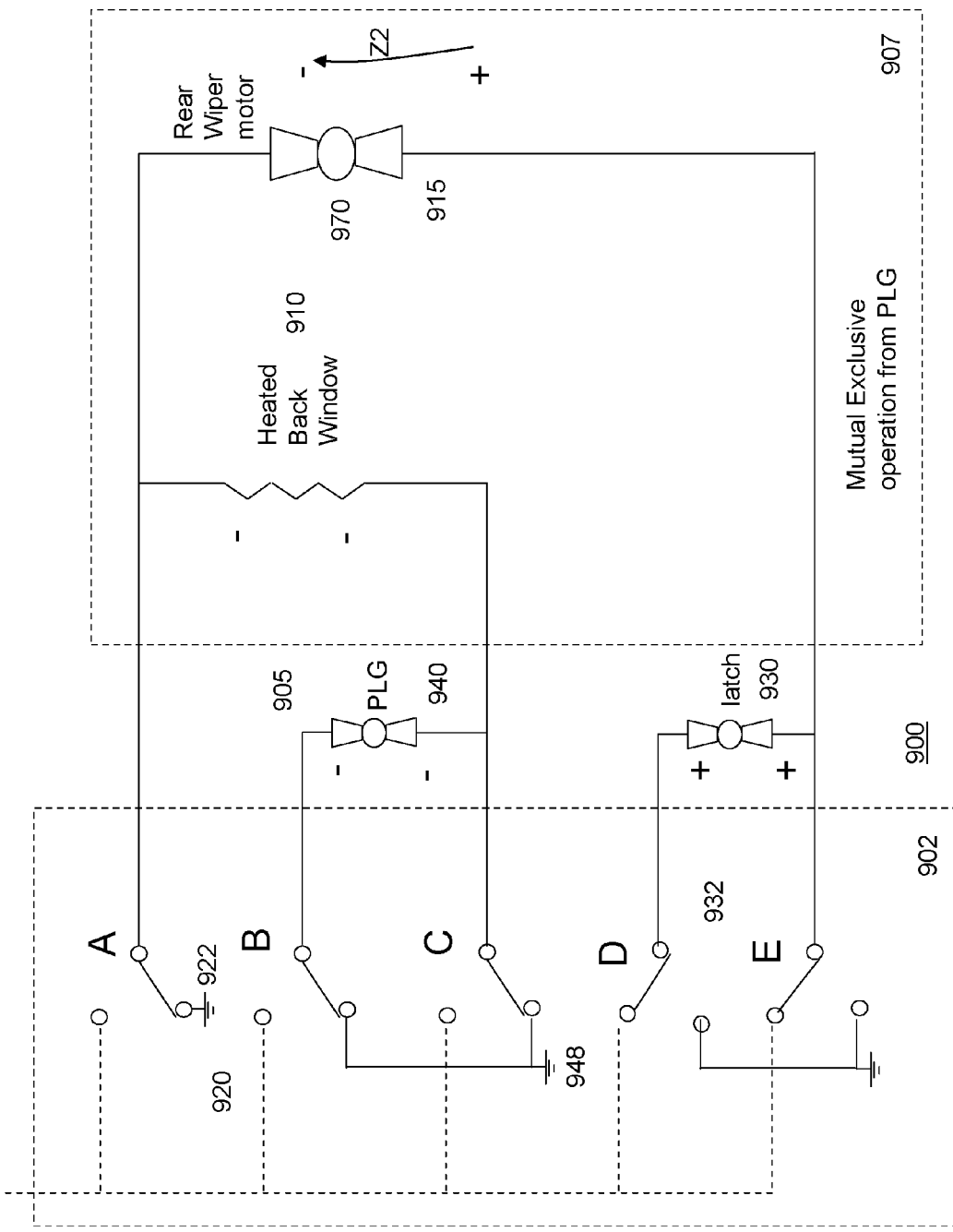
FIG. 9 is an example circuit for controlling current distribution.

I/O optimization may be achieved wherein the RZM has several outputs and operation moding allows the sharing of the outputs to reduce the number of discrete drivers as shown for example, in part, by FIG. 9, and by comparing FIG. 1 to FIG. 6.

FIG. 9 shows an example circuit 900 for operation moding where rear wiper motor is on, latch motor is off, heated back window is off and PLG motor is off. A portion of circuit 900, circuit 902, is included in rear zone ECU 630 of FIG. 6. Circuit 900 further includes a PLG subcircuit 905 connected to a subcircuit 907, which includes a heated back window subcircuit 910 and a rear wiper subcircuit 915. The PLG subcircuit 905 has a three way switch 920 and also includes a latch 930 with a switch 932. The three way switch 920 has a pole A connected to ground 922 and the heated back window subcircuit 910 and a rear wiper subcircuit 915. A PLG motor 940 is connected between pole B and pole C, which are both tied to ground 948. The latch 930 is connected between pole D and pole E of switch 932, both of which are tied to power. A heated back window subcircuit 910 is connected to pole A and to pole C, both of which are connected to ground. The rear window wiper subcircuit 915 includes a motor 970 connected between pole A and pole E. As implemented, the PLG 940, the latch 930, and the heated back window 910 are off and have no current flow running. The rear wiper motor 970 is on with the current running in direction Z2.

Figure 10:
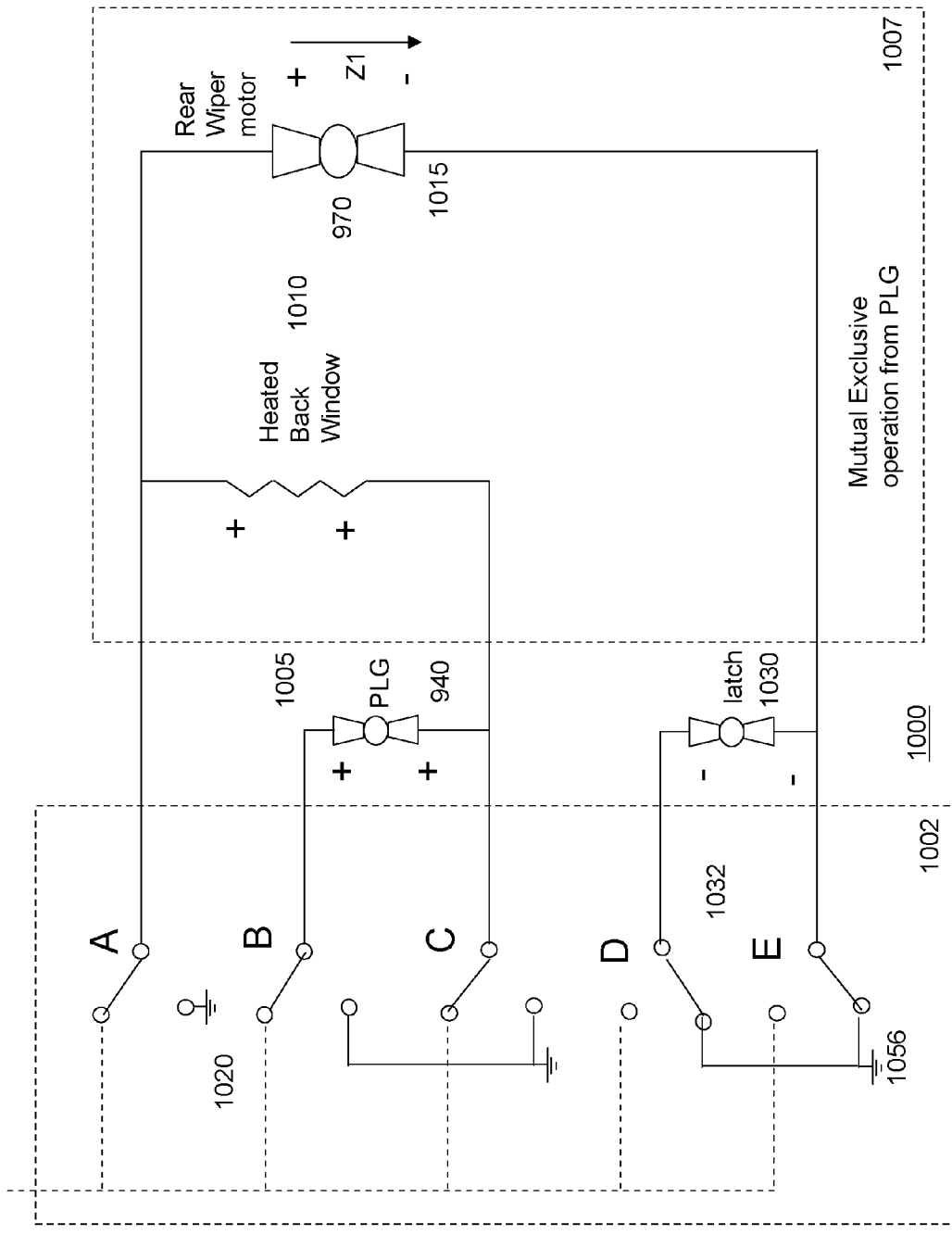
FIG. 10 is an example circuit for operation moding where rear wiper motor is on, latch motor is off, the heated back window is off, and PLG motor is off.

FIG. 10 shows an example circuit 1000 for operation moding where rear wiper motor is on, latch motor is off, heated back window is off and PLG motor is off. A portion of circuit 1000, circuit 1002, is included in rear zone ECU 630 of FIG. 6. Circuit 1000 further includes a PLG subcircuit 1005 connected to a subcircuit 1007, which includes a heated back window subcircuit 1010 and a rear wiper subcircuit 1015. The PLG subcircuit 1005 has a three way switch 1020 and also includes a latch 1030 with a switch 1032. The three way switch 1020 has a pole A connected to power and the heated back window subcircuit 1010 and a rear wiper subcircuit 1015. A PLG motor 1040 is connected between pole B and pole C, which are both tied to power. The latch 1030 is connected between pole D and pole E of switch 1032, both of which are tied to ground 1056. A heated back window subcircuit 1010 is connected to pole A and to pole C, both of which are connected to power. The rear window wiper subcircuit 1015 includes a rear wiper motor 1070 connected between pole A and pole E. As implemented, the PLG 1040, the latch 1030, and the heated back window 1010 are off and have no current flow running. The rear wiper motor 1070 is on with the current running in direction Z1.

Figure 11:
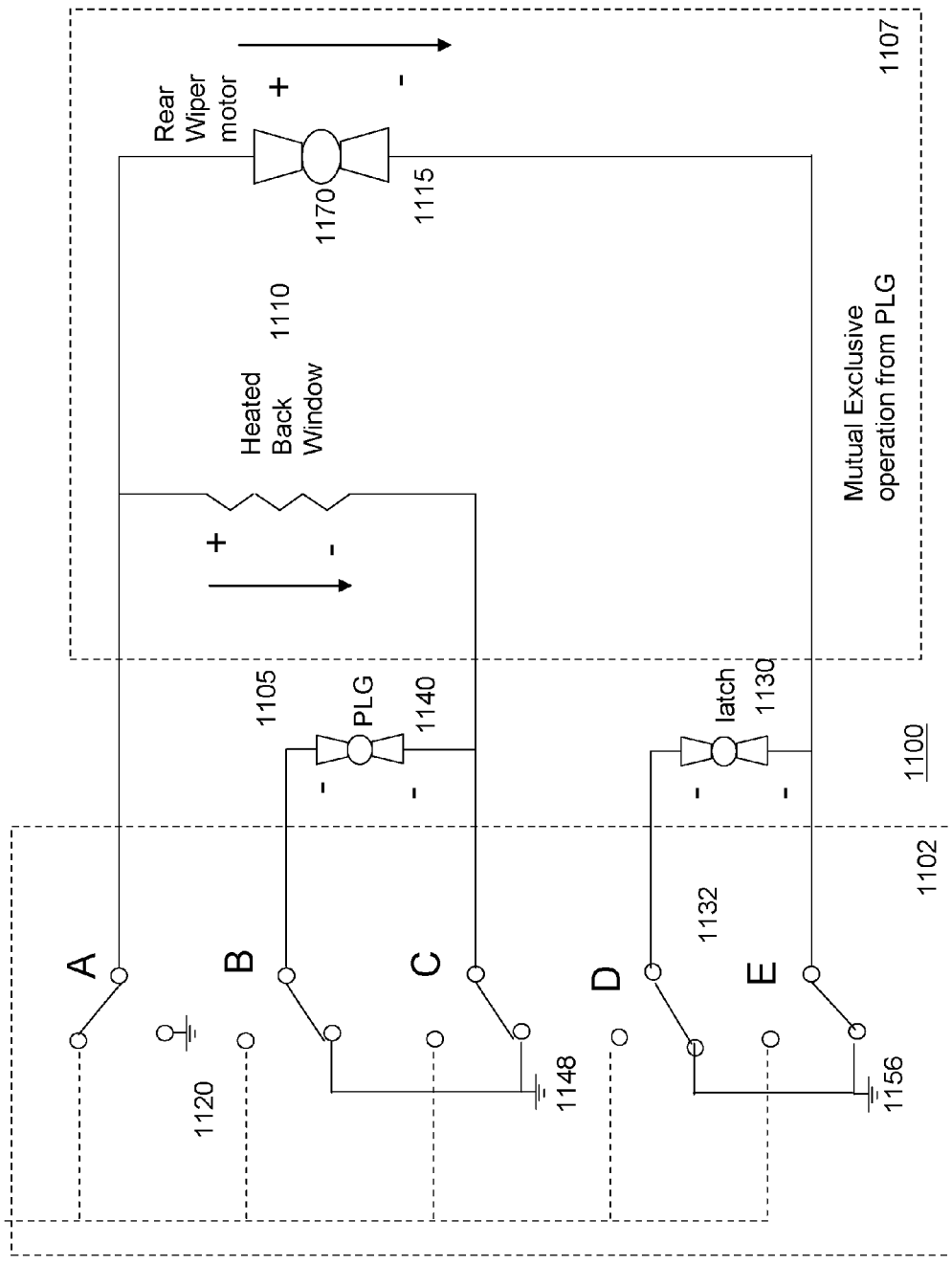
FIG. 11 is an example circuit for operation moding where rear wiper motor is on, latch motor is off, heated back window is on, and PLG motor is off.

FIG. 11 shows an example circuit 1100 for operation moding where rear wiper motor is on, latch motor is off, heated back window is on and PLG motor is off. A portion of circuit 1100, circuit 1102, is included in rear zone ECU 630 of FIG. 6. Circuit 1100 further includes a PLG subcircuit 1105 connected to a subcircuit 1107, which includes a heated back window subcircuit 1110 and a rear wiper subcircuit 1115. The PLG subcircuit 1105 has a three way switch 1120 and also includes a latch 1130 with a switch 1132. The three way switch 1120 has a pole A connected to power and the heated back window subcircuit 1110 and a rear wiper subcircuit 1115. A PLG motor 1140 is connected between pole B and pole C, which are both tied to ground 1148. The latch 1130 is connected between pole D and pole E of switch 1132, both of which are tied to ground 1156. A heated back window subcircuit 1110 is connected to pole A and to pole C, which is connected to ground 1148. The rear window wiper subcircuit 1115 includes a motor 1170 connected between pole A and pole E. As implemented, the PLG 1140, and the latch 1130 are off and have no current flow running. The heated back window 1110 and the rear window wiper circuit 1170 are on with the current running in direction Z1.

Figure 12:
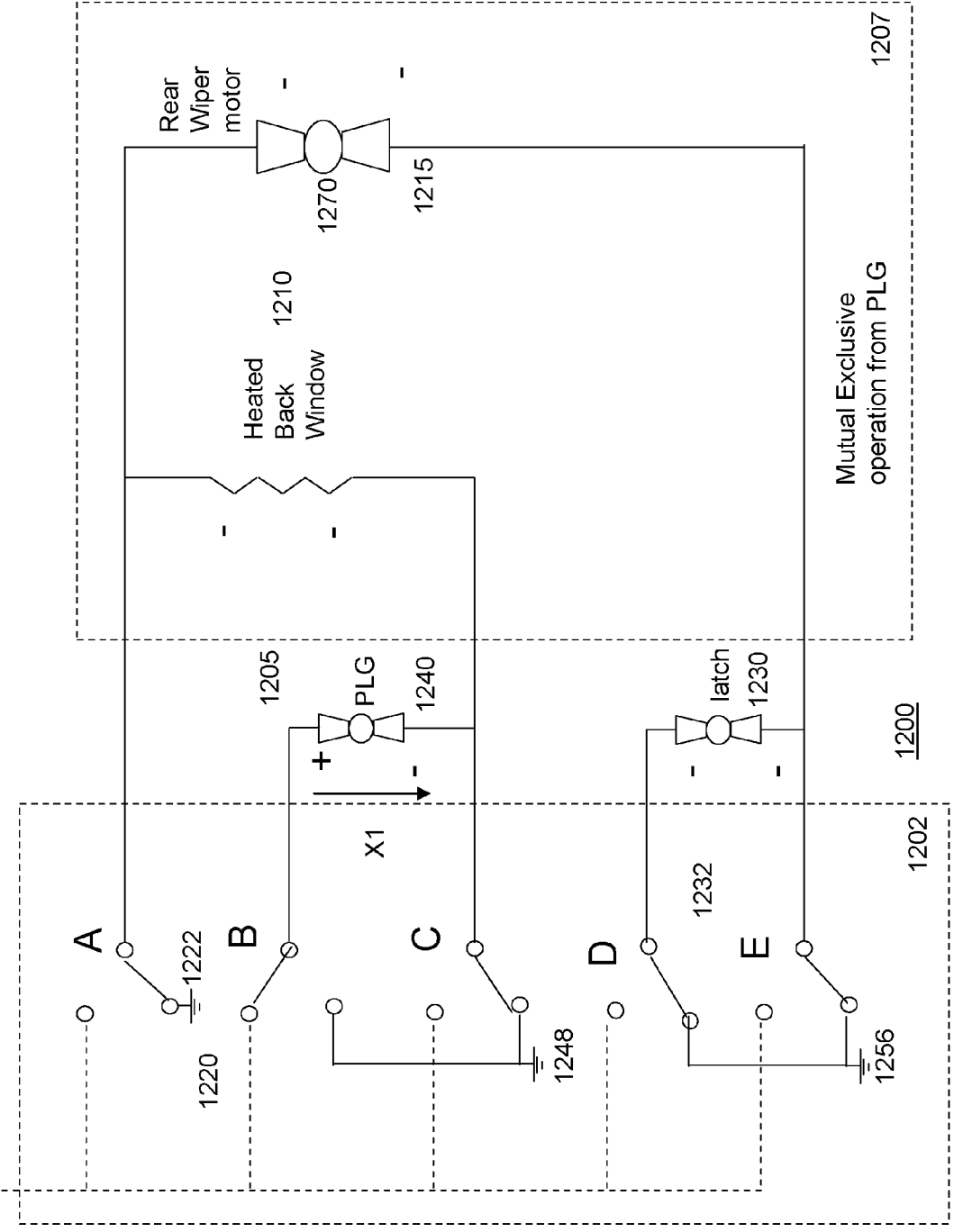

FIG. 12 shows an example circuit 1200 for operation moding where rear wiper motor is off, latch motor is off, heated back window is off and PLG motor is on. A portion of circuit 1200, circuit 1202, is included in rear zone ECU 630 of FIG. 6. Circuit 1200 further includes a PLG subcircuit 1205 connected to a subcircuit 1207, which includes a heated back window subcircuit 1210 and a rear wiper subcircuit 1215. The PLG subcircuit 1205 has a three way switch 1220 and also includes a latch 1230 with a switch 1232. The three way switch 1220 has a pole A connected to ground 1222 and the heated back window subcircuit 1210 and a rear wiper subcircuit 1215. A PLG motor 1240 is connected between pole B and pole C, where pole B is connected to power and pole C is connected to ground 1248. The latch 1230 is connected between pole D and pole E of switch 1232, both of which are tied to ground 1256. A heated back window subcircuit 1210 is connected to pole A and to pole C. The rear window wiper subcircuit 1215 includes a motor 1270 connected between pole A and pole E. As implemented, the heated back window 1210, the rear window motor 1270, and the latch 1230 are off and have no current flow running. The PLG 1240 is on with the current running in direction X1.

Figure 13:
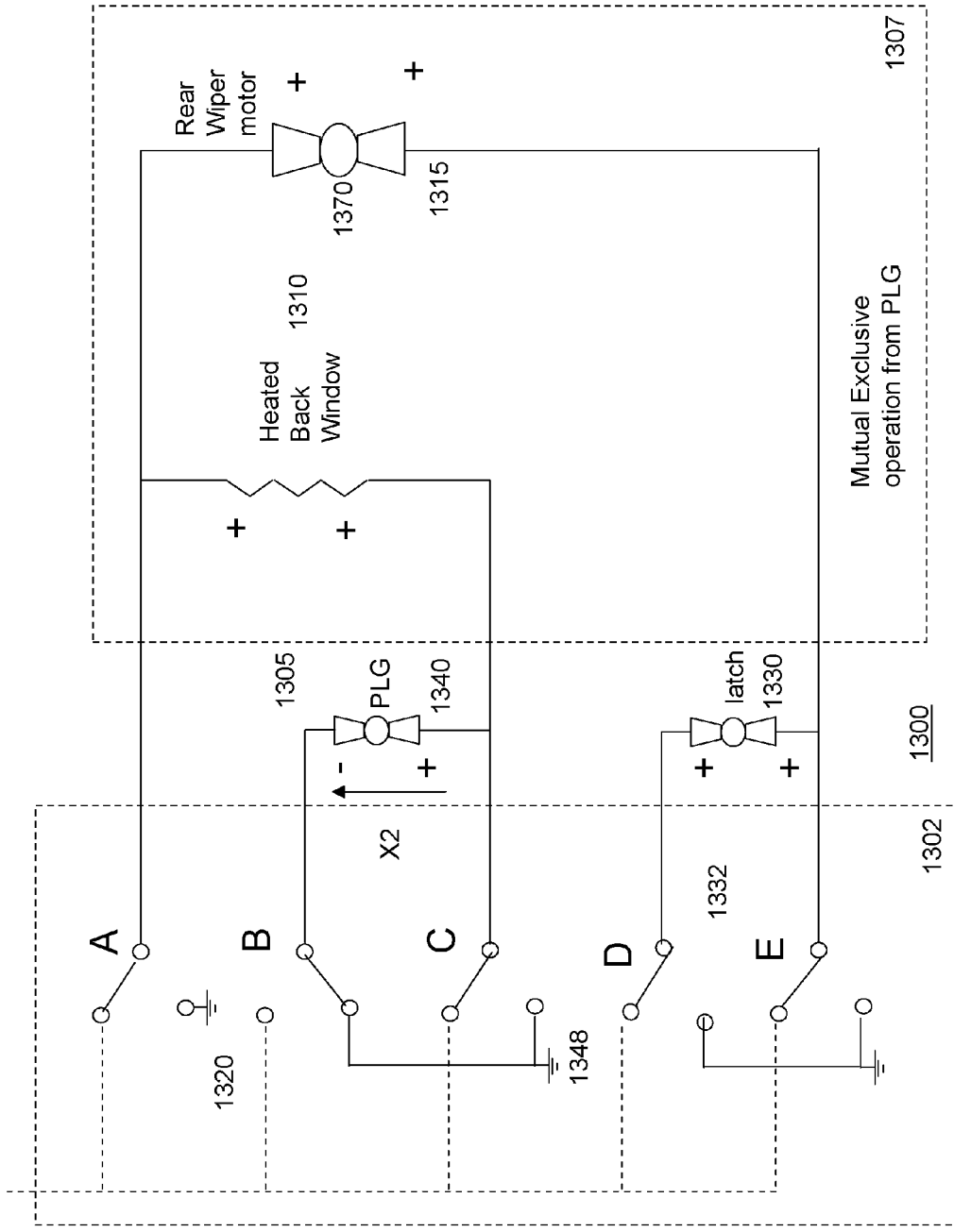

FIG. 13 shows an example circuit 1300 for operation moding where rear wiper motor is off, latch motor is off, heated back window is off and PLG motor is on. A portion of circuit 1300, circuit 1302, is included in rear zone ECU 630 of FIG. 6. Circuit 1300 further includes a PLG subcircuit 1305 connected to a subcircuit 1307, which includes a heated back window subcircuit 1310 and a rear wiper subcircuit 1315. The PLG subcircuit 1305 has a three way switch 1320 and also includes a latch 1330 with a switch 1332. The three way switch 1320 has a pole A connected to power and the heated back window subcircuit 1310 and a rear wiper subcircuit 1315. A PLG motor 1340 is connected between pole B and pole C, where pole B is connected to ground 1348 and pole C is connected to power. The latch 1330 is connected between pole D and pole E of switch 1332, both of which are tied to power. A heated back window subcircuit 1310 is connected to pole A and to pole C. The rear window wiper subcircuit 1315 includes a motor 1370 connected between pole A and pole E. As implemented, the heated back window 1310, the rear window motor 1370, and the latch 1330 are off and have no current flow running. The PLG 1340 is on with the current running in direction X2.

Figure 14:
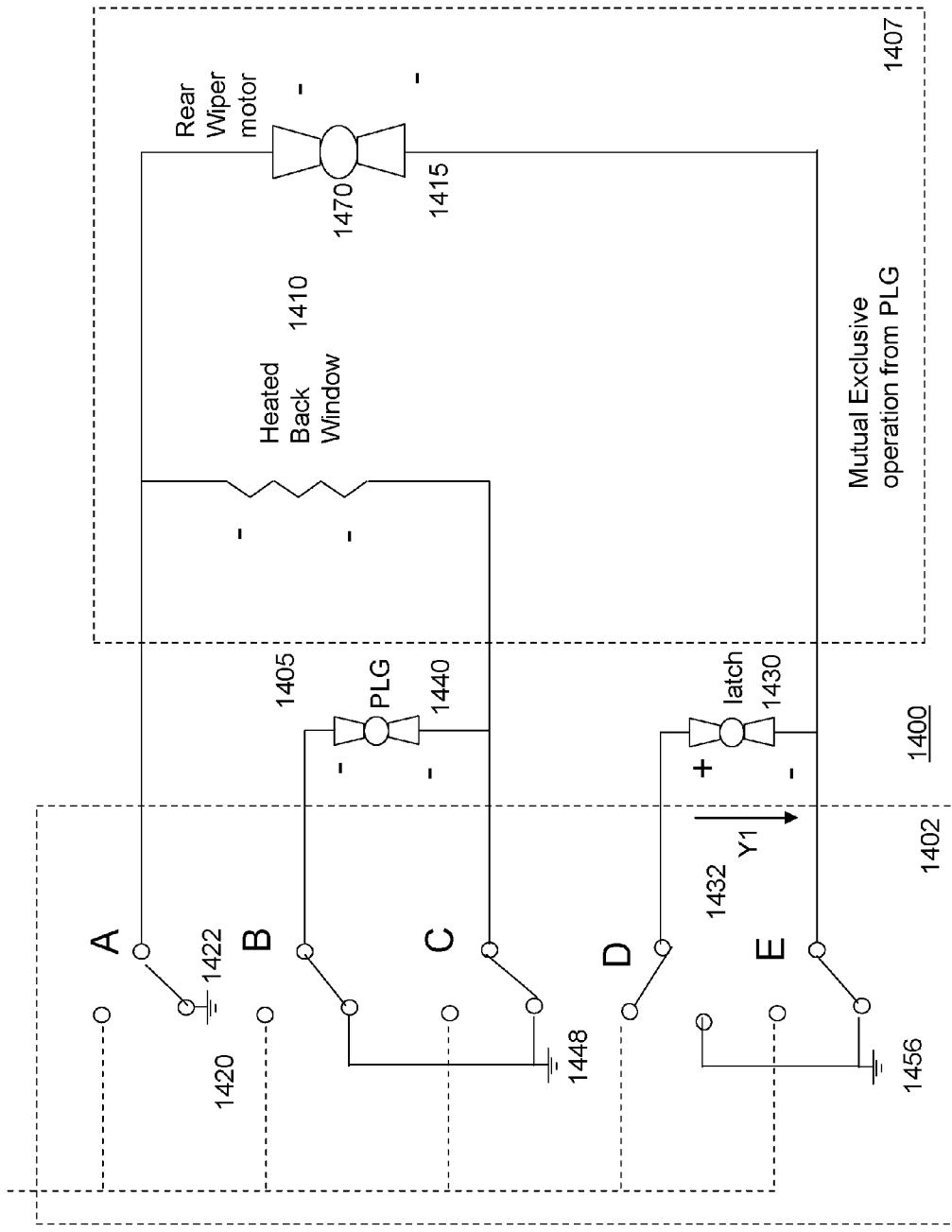
FIG. 14 is an example circuit for operation moding where rear wiper motor is off, latch motor is on, heated back window is off, and PLG motor is off.

FIG. 14 shows an example circuit 1400 for operation moding where rear wiper motor is off, latch motor is on, heated back window is off and PLG motor is off. A portion of circuit 1400, circuit 1402, is included in rear zone ECU 630 of FIG. 6. Circuit 1400 further includes a PLG subcircuit 1405 connected to a subcircuit 1407, which includes a heated back window subcircuit 1410 and a rear wiper subcircuit 1415. The PLG subcircuit 1405 has a three way switch 1420 and also includes a latch 1430 with a switch 1432. The three way switch 1420 has a pole A connected to ground 1422 and the heated back window subcircuit 1410 and a rear wiper subcircuit 1415. A PLG motor 1440 is connected between pole B and pole C, both of which are connected to ground 1448. The latch 1430 is connected between pole D and pole E of switch 1432, where pole D is connected to power and pole E is connected to ground 1456. A heated back window subcircuit 1410 is connected to pole A and to pole C. The rear window wiper subcircuit 1415 includes a motor 1470 connected between pole A and pole E. As implemented, the heated back window 1410, the rear window wiper motor 1470, and the PLG 1440 are off and have no current flow running. The latch 1430 is on with the current running in direction Y1.

Figure 15:
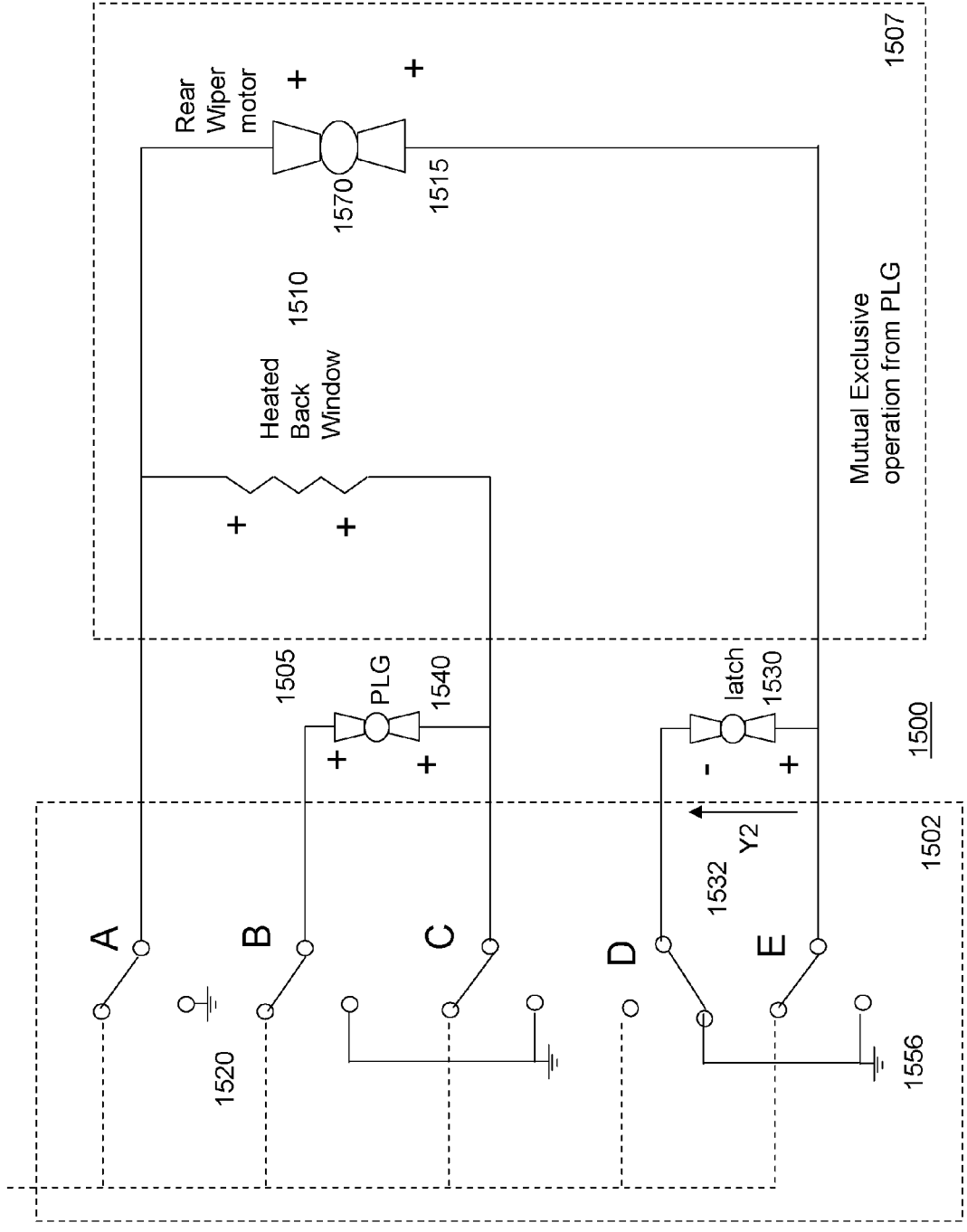
FIG. 15 is an example circuit for operation moding where rear wiper motor is off, latch motor is on, heated back window is off, and PLG motor is off.

FIG. 15 shows an example circuit 1500 for operation moding where rear wiper motor is off, latch motor is on, heated back window is off and PLG motor is off. A portion of circuit 1500, circuit 1502, is included in rear zone ECU 630 of FIG. 6. Circuit 1500 further includes a PLG subcircuit 1505 connected to a subcircuit 1507, which includes a heated back window subcircuit 1510 and a rear wiper subcircuit 1515. The PLG subcircuit 1505 has a three way switch 1520 and also includes a latch 1530 with a switch 1532. The three way switch 1520 has a pole A connected to power and the heated back window subcircuit 1510 and a rear wiper subcircuit 1515. A PLG motor 1540 is connected between pole B and pole C, both of which are connected to power. The latch 1530 is connected between pole D and pole E of switch 1532, where pole D is connected to ground 1556 and pole E is connected to power. A heated back window subcircuit 1510 is connected to pole A and to pole C. The rear window wiper subcircuit 1515 includes a motor 1570 connected between pole A and pole E. As implemented, the heated back window 1510, the rear window wiper motor 1570, and the PLG 1540 are off and have no current flow running. The latch 1530 is on with the current running in direction Y2.

In general, a vehicle includes a rear zone module (RZM) that includes at least a power liftgate (PLG) module, heated back window module, and a rear window wiper module. The vehicle further includes a controller configured to selectively control current with respect to at least the PLG module, heated back window module, and a rear window wiper module. The interconnections between the RZM and controller are minimized by sharing the interconnections as the PLG module operates mutually exclusively from the heated back window and rear window wiper module. In an example configuration, the PLG module is off and at least one of the heated back window and rear window wiper module are on. The rear window wiper module has multiple on configurations. The vehicle may further include a latch module. In another example, the heated back window module, and a rear window wiper module are off and at most one of the PLG module and the latch module is on. In one case, the PLG module has multiple on configurations and in another case, the latch module has multiple on configurations.

Although features and elements are described above in particular combinations, each feature or element can be used alone without the other features and elements or in various combinations with or without other features and elements.

What is claimed is:

1. A vehicle, comprising:
    a rear zone module (RZM) that includes at least a power liftgate (PLG) module, heated back window module, and a rear window wiper module;
    a circuit in the rear zone module configured to mutually exclusively operate the PLG module from the heated back window module and the rear window wiper module, wherein current flows only in one of the PLG or in at least one of the heated back window and rear window wiper module; and
    a controller configured to selectively control the current with respect to the circuit, wherein interconnections between the RZM and controller are minimized by sharing the interconnections.

2. The vehicle of claim 1, wherein the rear window wiper module has multiple on configurations with respect to the PLG module and the heated back window module.

3. The vehicle of claim 1, further comprising a latch module.

4. The vehicle of claim 3, wherein at most one of the PLG module and the latch module is on.

5. The vehicle of claim 4, wherein the PLG module has multiple on configurations with respect to the rear window wiper module and the heated back window module.

6. The vehicle of claim 4, wherein the latch module has multiple on configurations.

7. The vehicle of claim 1, wherein the PLG module has multiple on configurations with respect to the rear window wiper module and the heated back window module.

8. A method for controlling vehicle operations, comprising:
    providing a rear zone module (RZM) that includes at least a power liftgate (PLG) module, heated back window module, and a rear window wiper module, wherein the PLG module operates mutually exclusively from the heated back window and rear window wiper module and wherein current flows only in one of the PLG or in at least one of the heated back window and rear window wiper module; and
    selectively controlling the current with respect to at least the PLG module, heated back window module, and a rear window wiper module, wherein interconnections between the RZM and controller are minimized by sharing the interconnections.

9. The method of claim 8, wherein the rear window wiper module has multiple on configurations with respect to the PLG module and the heated back window module.

10. The method of claim 8, further comprising providing a latch module.

11. The vehicle of claim 10, wherein at most one of the PLG module and the latch module is on.

12. The vehicle of claim 11, wherein the PLG module has multiple on configurations with respect to the rear window wiper module and the heated back window module.

13. The vehicle of claim 11, wherein the latch module has multiple on configurations with respect to the rear window wiper module and the heated back window module.

14. The vehicle of claim 8, wherein the PLG module has multiple on configurations with respect to the rear window wiper module and the heated back window module.

15. A circuit, comprising:
    a rear zone circuit that includes at least a power liftgate (PLG) circuit, heated back window circuit, and a rear window wiper circuit, wherein the PLG circuit operates mutually exclusively from the heated back window circuit and rear window wiper circuit and wherein current flows only in one of the PLG or in at least one of the heated back window and rear window wiper module; and
    a control circuit configured to selectively control current with respect to at least the PLG circuit, heated back window circuit, and a rear window wiper circuit, wherein interconnections between the rear zone circuit and control circuit are minimized by sharing the interconnections.

16. The circuit of claim 15, wherein the rear window wiper circuit and the heated back window circuit has multiple on configurations with respect to the PLG module.

* * * * *